(12) United States Patent
Yamada et al.

(10) Patent No.: US 8,355,148 B2
(45) Date of Patent: Jan. 15, 2013

(54) IMAGE PROCESSING APPARATUS, METHOD AND STORAGE MEDIUM PROVIDING CUSTOMIZED INTERFACE DISPLAYS

(75) Inventors: Tetsuya Yamada, Kawasaki (JP); Satoshi Kuroyanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 11/275,608

(22) Filed: Jan. 19, 2006

(65) Prior Publication Data
US 2006/0164675 A1 Jul. 27, 2006

(30) Foreign Application Priority Data
Jan. 24, 2005 (JP) .................................. 2005-015845

(51) Int. Cl.
*G06F 3/12* (2006.01)
(52) U.S. Cl. ....... 358/1.15; 358/1.14; 345/650; 345/676; 715/700; 715/736; 715/744; 715/745; 715/746
(58) Field of Classification Search .................. 358/1.15, 358/1.14; 715/744–748, 765, 736, 700; 345/650, 345/676
See application file for complete search history.

(56) References Cited

U.S. PATENT DOCUMENTS

| | | | |
|---|---|---|---|
| 6,549,947 B1 * | 4/2003 | Suzuki ........................... | 709/229 |
| 6,594,545 B1 * | 7/2003 | Kakigi ........................... | 700/223 |
| 7,263,661 B2 * | 8/2007 | Chavers et al. ............... | 715/744 |
| 7,269,763 B2 * | 9/2007 | Maehara ........................ | 714/48 |
| 7,325,203 B2 * | 1/2008 | Katano ........................... | 715/765 |
| 7,370,087 B1 * | 5/2008 | O'Toole, Jr. .................. | 709/217 |
| 2001/0034852 A1 * | 10/2001 | Kawashima .................. | 714/4 |
| 2002/0012046 A1 * | 1/2002 | Ishino ............................ | 348/96 |
| 2003/0014511 A1 * | 1/2003 | Maekawa et al. ............. | 709/223 |
| 2004/0212823 A1 * | 10/2004 | Chavers et al. ............... | 358/1.15 |
| 2004/0216058 A1 * | 10/2004 | Chavers et al. ............... | 715/810 |
| 2005/0134893 A1 * | 6/2005 | Han ............................... | 358/1.14 |

FOREIGN PATENT DOCUMENTS

| | | |
|---|---|---|
| JP | 2000-298561 | 10/2000 |
| JP | 2001-345983 | 12/2001 |
| JP | 2004-050585 | 2/2005 |

* cited by examiner

*Primary Examiner* — Jacky X Zheng
(74) *Attorney, Agent, or Firm* — Fitzpatrick, Cella, Harper & Scinto

(57) ABSTRACT

In a system with a plurality of image processing apparatuses connected communicably, customization of various kinds of information displayed on each image processing apparatus is facilitated. In order to achieve this object, an information processing method of the invention is an information processing method in a copying machine (102) communicably connected to a GUI generation device (104). The method includes a display step of displaying a screen registered in advance in image processing, a step (step S601) of requesting, of the GUI generation device (104), information about the display contents of the screen in a predetermined state, a step (step S602) of receiving the information about the display contents of the screen from the GUI generation device (104), and a step of generating a screen by using the received information about the display contents of the screen. In the display step, the screen generated in the generation step is displayed in the predetermined state.

6 Claims, 12 Drawing Sheets

IMAGE PROCESSING APPARATUS, METHOD AND STORAGE MEDIUM PROVIDING CUSTOMIZED INTERFACE DISPLAYS

FIELD OF THE INVENTION

The present invention relates to a user interface customization technique in an image processing apparatus.

BACKGROUND OF THE INVENTION

In an image processing apparatus such as a copying machine or facsimile apparatus, conventionally, various kinds of information are displayed on an operation panel provided on the apparatus main body to inform a user of various kinds of information set as processing conditions for image processing or information about the internal state of the apparatus.

To ensure better operability for the user or to allow the apparatus administrator to limit functions available to the user, various kinds of information to be displayed can be customized in the apparatus.

However, in, e.g., a company which has introduced a number of image processing apparatuses, customizing all image processing apparatuses increases the burden on the administrator of those apparatuses.

For this reason, in a system having a plurality of image processing apparatuses connected so as to be able to communicate each other, it is preferable to customize all image processing apparatuses by one customization operation.

SUMMARY OF THE INVENTION

The present invention has been made in consideration of the above problem, and has as its object to facilitate customization of various kinds of information displayed on each image processing apparatus in a system with a plurality of image processing apparatuses connected so as to be able to communicate each other.

In order to achieve the above object, an image processing apparatus according to the present invention has the following arrangement. That is, an image processing apparatus which is communicably connected to an information processing apparatus is provided, comprising:

a display unit configured to display a screen in advance in image processing;

a determination unit configured to determine whether to request, of the information processing apparatus, information about display contents of a screen to be displayed;

a request unit configured to request, of the information processing apparatus, the information about the display contents of the screen to be displayed on the display unit when the determination unit determines to do the request;

a reception unit configured to receive the information about the display contents of the screen from the information processing apparatus on the basis of the request from the request unit; and a generation unit configured to generate a screen by using the information about the display contents of the screen, which is received by the reception unit, wherein the display unit displays the screen generated by the generation unit.

According to the present invention, in a system with a plurality of image processing apparatuses connected to enable to communicate each other, various kinds of information displayed on each image processing apparatus can easily be customized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the following embodiments, a copying machine (digital multifunction apparatus) is used as an example of the present invention (image processing apparatus).

[First Embodiment]

<Configuration of Information Processing System>

Figure 1:
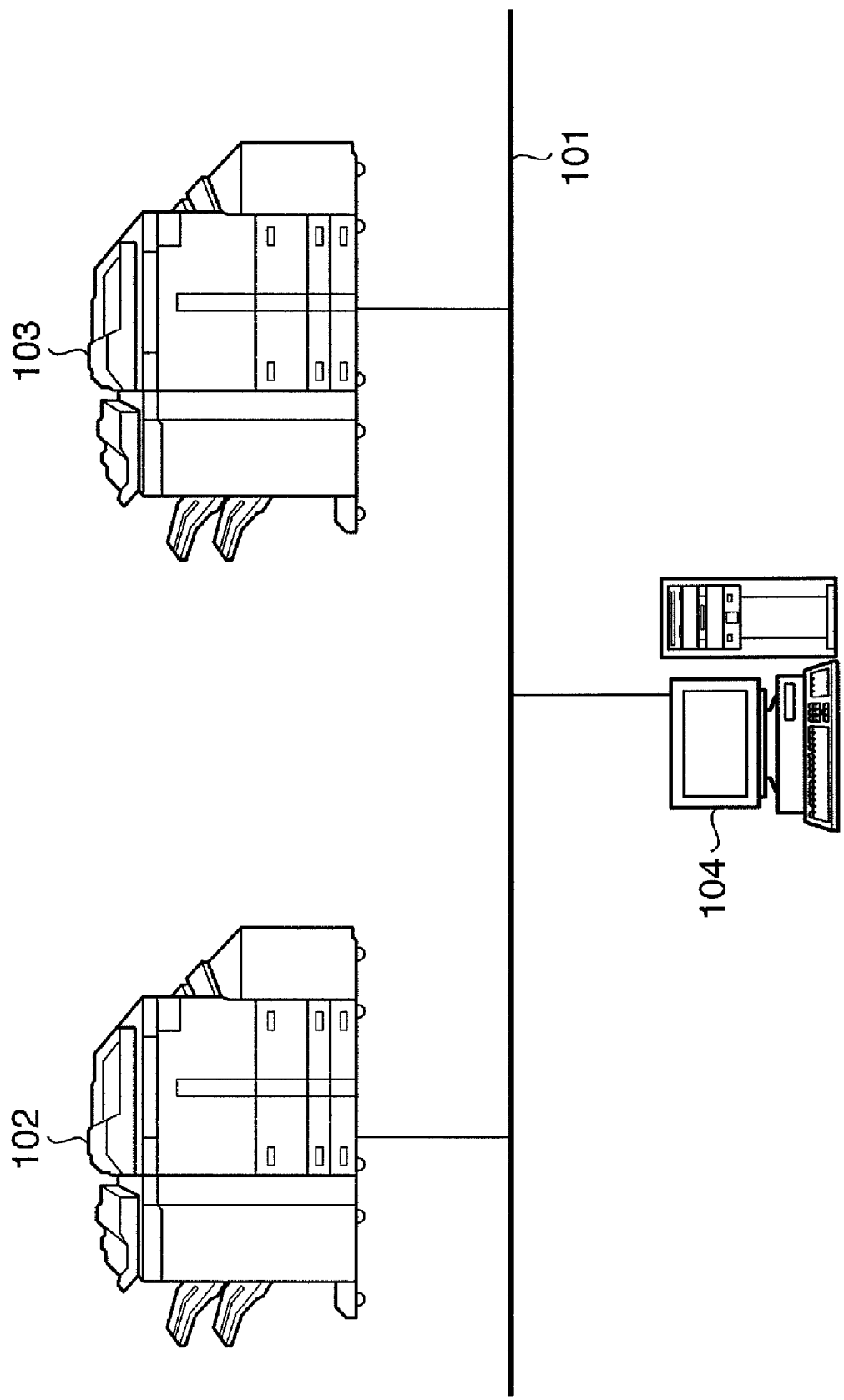
FIG. 1 is a view showing the configuration of an information processing system having a plurality of copying machines according to an embodiment of the present invention.

FIG. 1 is a view showing the configuration of an information processing system according to an embodiment of the present invention in which a plurality of copying machines are connected communicably.

Referring to FIG. 1, reference numeral 101 denotes a LAN; 102 and 103, copying machines; and 104, a GUI generation device (more specifically, a personal computer (PC) having a GUI generation function). With this arrangement, the copying machines 102 and 103 can display, on their operation panels, a screen acquired from the GUI generation device.

<Functional Arrangement of Copying Machine>

The functional arrangement of the copying machine (102, 103) according to the embodiment of the present invention will be described next with reference to FIG. 2.

Figure 2:
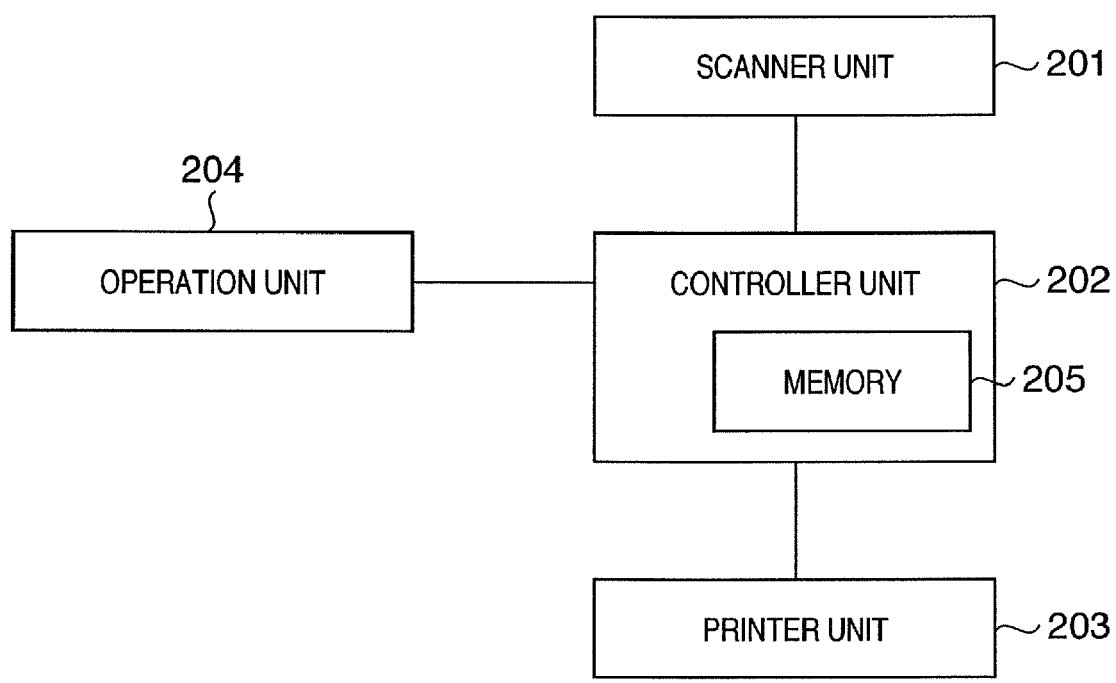
FIG. 2 is a block diagram showing the functional arrangement of the copying machine.

FIG. 2 is a block diagram showing the functional arrangement of the copying machine. The block diagram particularly illustrates a digital multifunction apparatus with COPY, PRINT, and FAX functions.

Referring to FIG. 2, a scanner unit 201 reads a document. A controller unit 202 processes the image read by the scanner unit 201 and stores the image in a memory 205. An operation unit 204 sets various kinds of printing conditions for the image read by the scanner unit 201. On the basis of image data read out from the memory 205, a printer unit 203 forms an image on a printing paper sheet under the printing conditions set by the operation unit 204.

<Detailed Configuration of Controller Unit 202>

The hardware configuration of the controller unit 202 to control the copying machine (102, 103) will be described next in detail with reference to FIG. 3.

Figure 3:
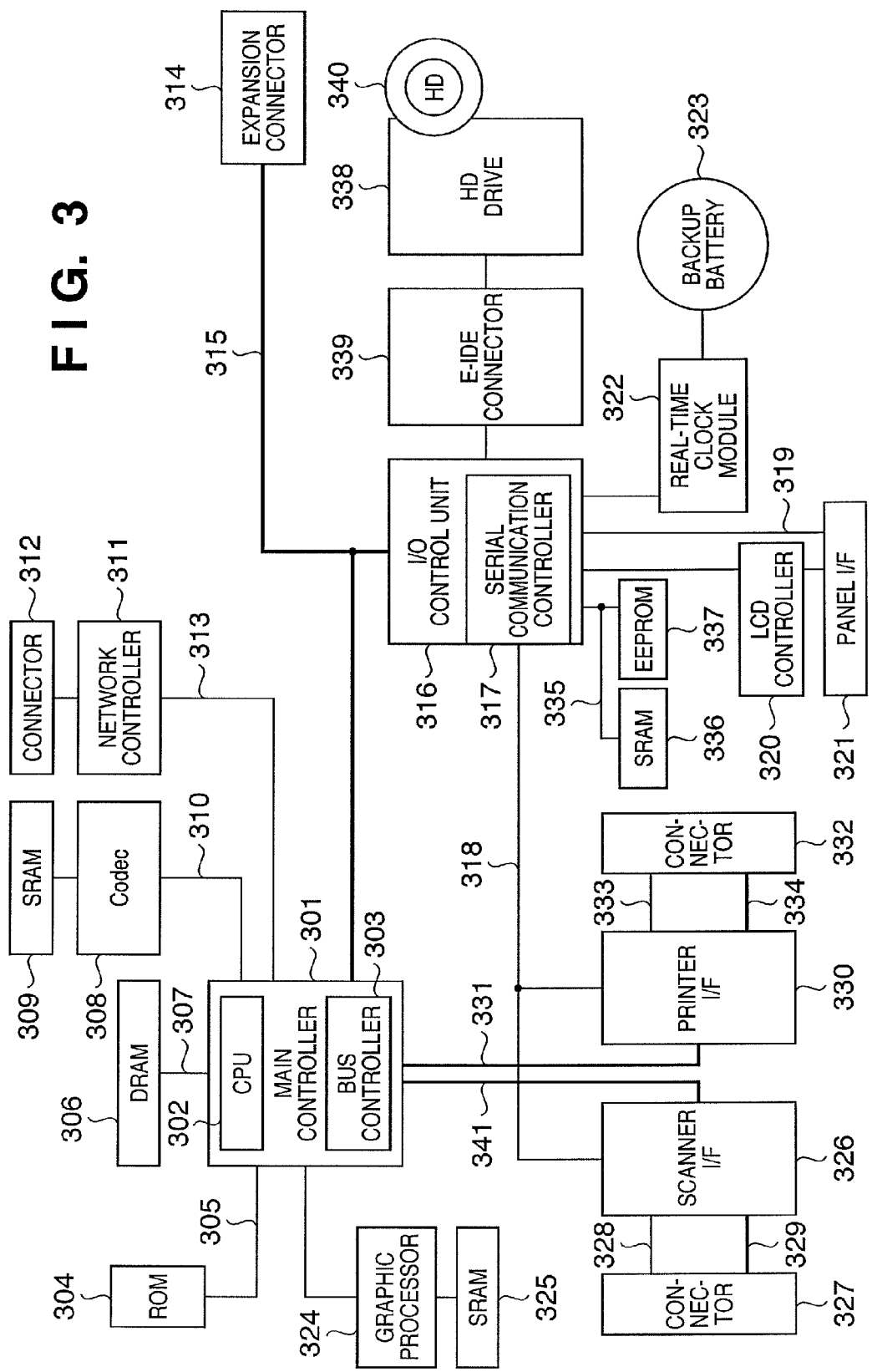
FIG. 3 is a block diagram showing the hardware configuration of a controller unit to control the copying machine.

As shown in FIG. 3, a main controller 361 in the controller unit 202 mainly includes a CPU 302, bus controller 303, and various kinds of I/F controller circuits.

The CPU 302 and bus controller 303 control the operation of the entire copying machine (102, 103). The CPU 302 operates on the basis of a program read out from a ROM 304 through a ROM I/F 305. An operation of interpreting received PDL (Page Description Language) code data and rasterizing it to raster image data is also described in this program and processed by software. The bus controller 303 controls transfer of data input/output to/from each I/F. The bus controller 303 executes arbitration in bus contention or controls DMA data transfer.

A DRAM 306 is connected to the main controller 301 through a DRAM I/F 307 and used as a work area for the CPU 302 to operate or an area to store image data.

A codec 308 compresses raster image data stored in the DRAM 306 by a scheme such as MH, MR, MMR, JBIG, or JPEG and conversely expands compressed and stored code data. An SRAM 309 is used as a temporary work area of the codec 308. The codec 308 is connected to the main controller 301 through an I/F 310. Data transfer between the codec 308 and the DRAM 306 is controlled by the bus controller 303 and done as DMA transfer.

A graphic processor 324 executes processing such as rotation, scaling, color space conversion, and binarization for raster image data stored in the DRAM 306. An SRAM 325 is used as a temporary work area of the graphic processor 324. The graphic processor 324 is connected to the main controller 301 through an I/F. Data transfer between the graphic processor 324 and the DRAM 306 is controlled by the bus controller 303 and done as DMA transfer.

A network controller 311 is connected to the main controller 301 through an I/F 313 and to an external network through a connector 312. An the network, Ethernet is used generally.

An expansion connector 314 to connect an expansion board and an I/O control unit 316 are connected to a general-purpose high-speed bus 315. As the general-purpose high-speed bus, a PCI bus is used generally. The I/O control unit 316 has an asynchronous serial communication controller 317 with two channels to transmit/receive control commands to/from the CPUs of the scanner unit 201 and printer unit 203. The I/O control unit 316 is connected to a scanner I/F circuit 326 and printer I/F circuit 330 through an I/O bus 318.

A panel I/F 321 is connected to an LCD controller 320 and includes an I/F to execute display on the liquid crystal screen on the operation unit 204 and a key input I/F to execute input of hard keys or touch panel keys.

The operation unit 204 has a liquid crystal display unit, a touch panel input device bonded to the liquid crystal display unit, and a plurality of hard keys. A signal input by the touch panel or hard keys is transmitted to the CPU 302 through the above-described panel I/F 321. The liquid crystal display unit displays image data received from the panel I/F 321. The liquid crystal display unit displays image data or functions in the operation of the copying machine (102, 103).

A real-time clock module 322 updates and saves the date and time managed in the device and is backed up by a backup battery 323.

An E-IDE interface 339 is used to connect an external storage device. In this embodiment, a hard disk drive 338 is connected through the I/F to store image data in a hard disk 340 or read out image data from the hard disk 340. Connectors 327 and 332 are connected to the scanner unit 201 and printer unit 203, respectively, and include asynchronous serial I/Fs (328, 333) and video I/Fs (329, 334).

The scanner I/F 326 is connected to the scanner unit 201 through the connector 327. The scanner I/F 326 is connected to the main controller 301 through a scanner bus 341. The scanner I/F 326 has a function of executing predetermined processing for an image received from the scanner unit 201 and also a function of outputting, to the scanner bus 329, a control signal generated on the basis of a video control signal sent from the scanner unit 201. Data transfer from the scanner bus 329 to the DRAM 306 is controlled by the bus controller 303.

The printer I/F 330 is connected to the printer unit 203 through the connector 332. The printer I/F 330 is connected to the main controller 301 through a printer bus 331. The printer I/F 330 has a function of executing predetermined processing for image data output from the main controller 301 and outputting the image data to the printer unit 203 and also a function of outputting, to the printer bus 331, a control signal generated on the basis of a video control signal sent from the printer unit 203.

Transfer of raster image data rasterized on the DRAM 306 to the printer unit 203 is controlled by the bus controller 303. The data is DMA-transferred to the printer unit 203 through the printer bus 331 and video I/F 334.

An SRAM 336 is a memory capable of holding stored contents by a power supplied from a backup battery even when the entire copying machine is powered off. The SRAM 336 is connected to the I/O control unit through a bus 335. An EEPROM 337 is also a memory connected to the I/O control unit through the bus 335. Details of the hardware configuration of the controller unit 202 have been described above.

<Arrangement of Operation Unit 204>

Figure 4:
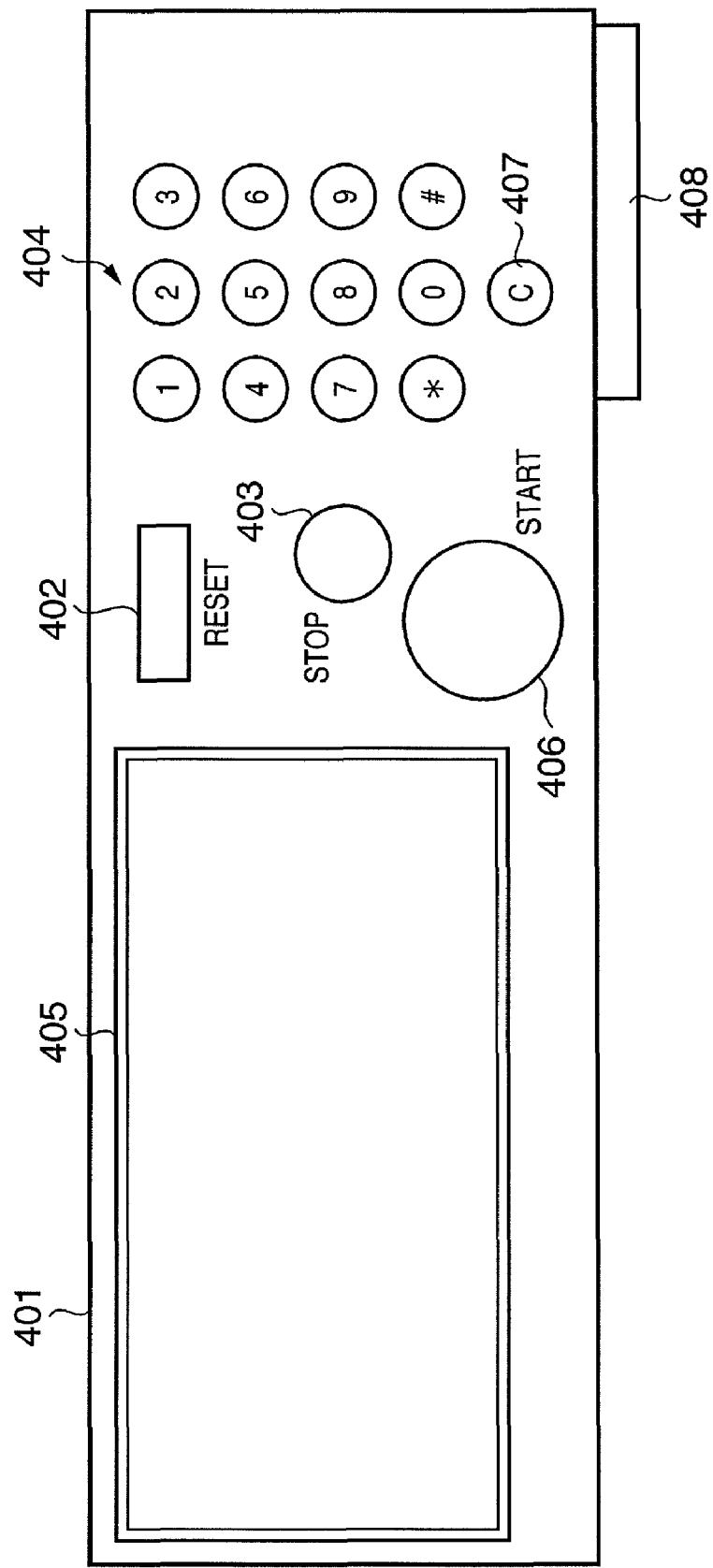
FIG. 4 is a view showing the arrangement of an operation unit.
Figure 9:
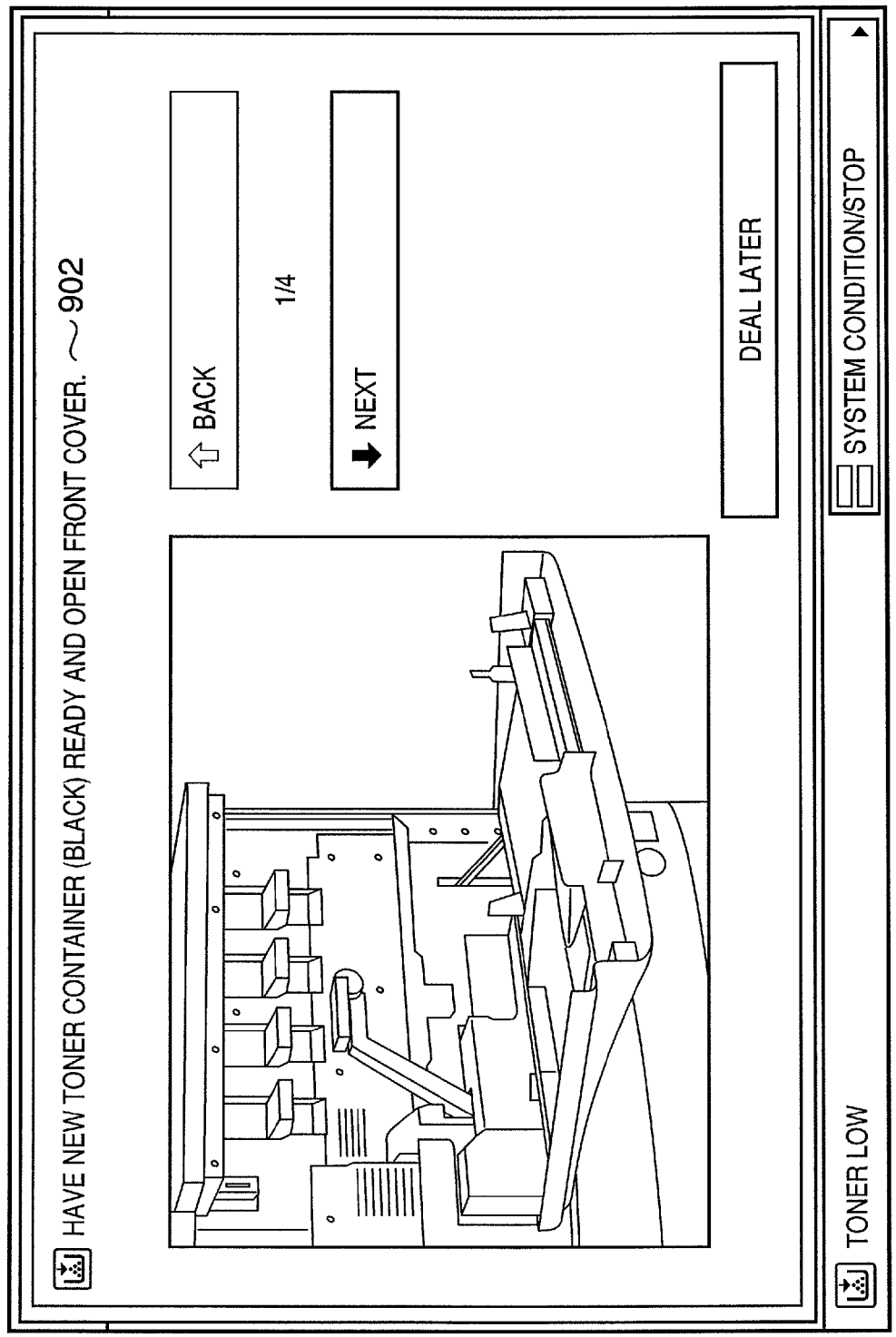
FIG. 9 is a view showing an example of the display screen of the operation unit.

The arrangement of the operation unit 204 to do various kinds of print setting will be described next. An operation unit 401 shown in FIG. 4 is connected to the panel I/F 321 in FIG. 3. A reset key 402 is used to cancel, e.g., a set value set by the user. A stop key 403 is used to stop a running job. A ten-key pad 404 is used to input, e.g., numerical values. An operation screen 405 is a touch panel and more specifically displays a screen (screen registered in advance) as shown in FIG. 9. There are a number of buttons on the touch panel to perform various settings. A start key 406 is used to start a job to, e.g., read a document. A clear key 407 is used to clear settings or the like.

<Hardware Configuration of Scanner Unit 201 and Printer Unit 203>

Figure 5:
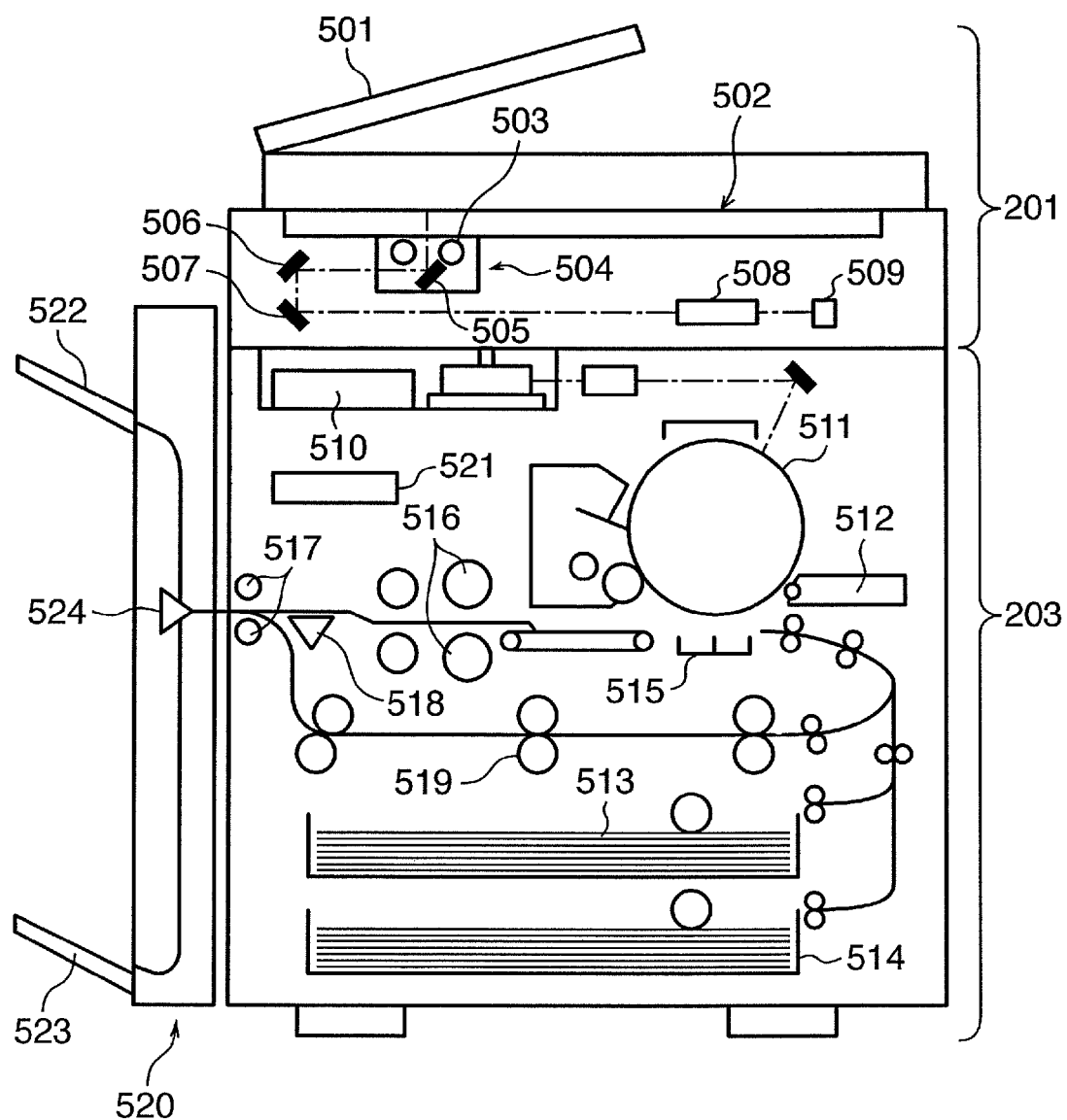
FIG. 5 is a sectional view of a scanner unit and printer unit.

FIG. 5 is a sectional view of the scanner unit 201 and printer unit 203. A document feeder 501 in the scanner unit 201 feeds document pages sequentially from the last one onto a platen glass 502 and discharges the document page on the platen glass 502 after the end of document read operation.

When the document is conveyed on the platen glass 502, a lamp 503 is turned on. A scanner unit 504 starts moving to exposure and scan the document. Reflected light from the document is guided to a CCD image sensor 509 by mirrors 505 to 508.

The image of the thus scanned document is read by the CCD 509. Image data output from the CCD 509 is subjected to predetermined processing and transferred to the printer unit 203 and the core unit of the image input/output control unit.

The printer unit 203 has a laser driver to drive a laser light-emitting unit 510. The laser driver drives the laser light-emitting unit 510 to emit light in accordance with the image data output from the scanner unit 201.

A printer control unit 521 is connected to an external device by a network and processes input image data and drives the laser light-emitting unit 510 to emit light in accordance with the image data.

The laser beam is swept by a rotating polygon mirror to strike a photosensitive drum 511 so that a latent image corresponding to exposure of the laser beam is formed on the photosensitive drum 511. A developing unit 512 applies a developer to the latent image portion on the photosensitive drum 511.

In synchronism with the start of laser irradiation, a printing paper sheet is fed from one of cassettes 513 and 514 and conveyed to a transfer unit 515. The developer adhered to the photosensitive drum 511 is transferred to the printing paper sheet.

The printing paper sheet with the transferred developer is conveyed to a fixing unit 516. The developer is fixed to the printing paper sheet by heat and pressure of the fixing unit 516.

The printing paper sheet that has passed through the fixing unit 516 is discharged by discharge rollers 517. A sorter 520 sorts and stores discharged printing paper sheets in bins.

The uppermost bin of the sorter 520 is a sample tray 522. A tray 523 capable of carrying a large output also exists. The discharge route to the sample tray 522 or tray 523 is switched by a flapper 524.

In a double-sided printing mode, the rotation directions of the discharge rollers 517 are reversed so that the printing paper sheet is guided to the refeed convey path by a flapper 518. In a multiple printing mode, the printing paper sheet is guided to the refeed convey path by the flapper 518 without conveying it to the discharge rollers 517. The printing paper sheet guided to the reefed convey path is fed to the transfer unit 515 at the above-described timing.

<Customization Processing>

Figure 6:
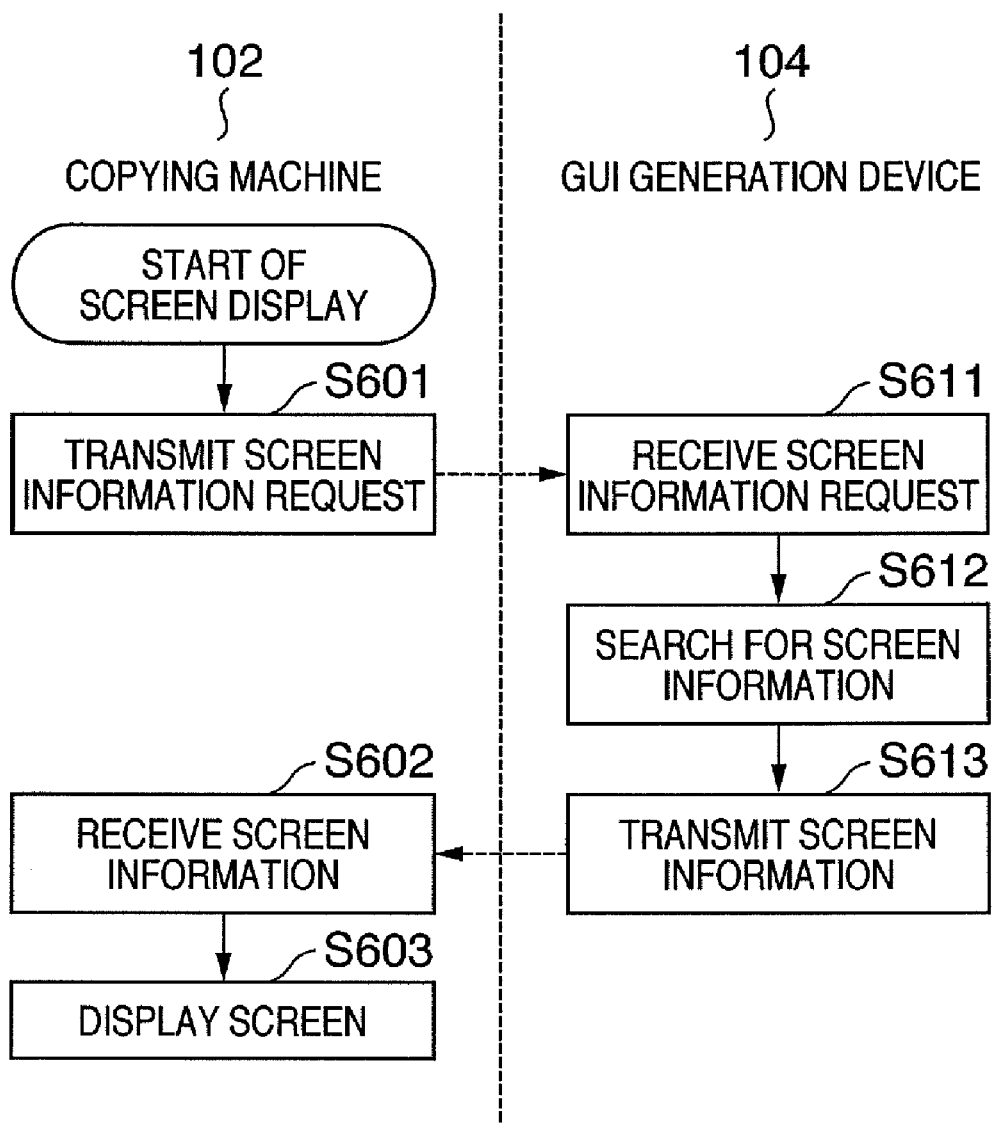
FIG. 6 is a flowchart showing the flow of display screen customization processing by the copying machine and GUI generation device according to an embodiment of the present invention.

Display screen customization processing by the copying machine (102) and GUI generation device (104) according to the first embodiment of the present invention will be described next with reference to FIG. 6. Customization of the display screen of the copying machine 102 will be exemplified below. The processing also applies to customization of the display screen of the copying machine 103.

At the start of new screen display, in step S601, the copying machine (102) transmits a screen ID to uniquely specify the operation screen to be displayed, user information of the user who uses the copying machine, and location information representing the installation location of the copying machine to the GUI generation device 104 as a screen information request.

In step S611, the GUI generation device 104 receives the screen information request. In step S612, an appropriate screen in the GUI generation device 104 is searched for on the basis of the received information (screen ID, user information, and location information). In step S613, found screen information is transmitted to the copying machine (102).

The GUI generation device 104 builds a customization screen information database in a hard disk (not shown). When the database is searched on the basis of all or at least one of the screen ID, user information, and location information, customization screen information suitable for the given conditions can be specified.

In step S602, the copying machine (102) receives the transmitted screen information. In step S603, the screen is displayed on the basis of the received screen information.

Figure 7:
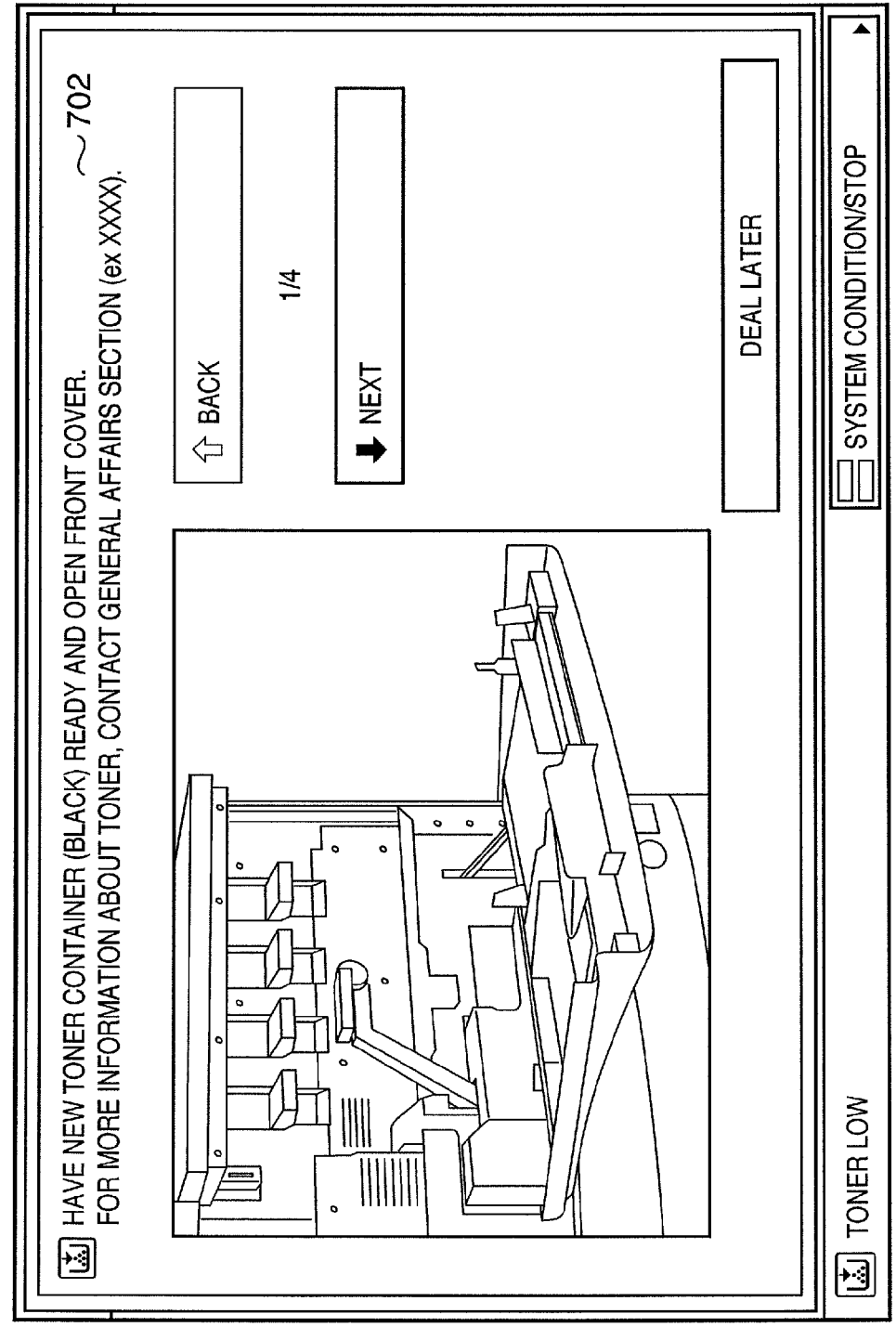
FIG. 7 is a view showing a screen example in which a message is customized to additionally display where to make contact with the toner manager.
Figure 8:
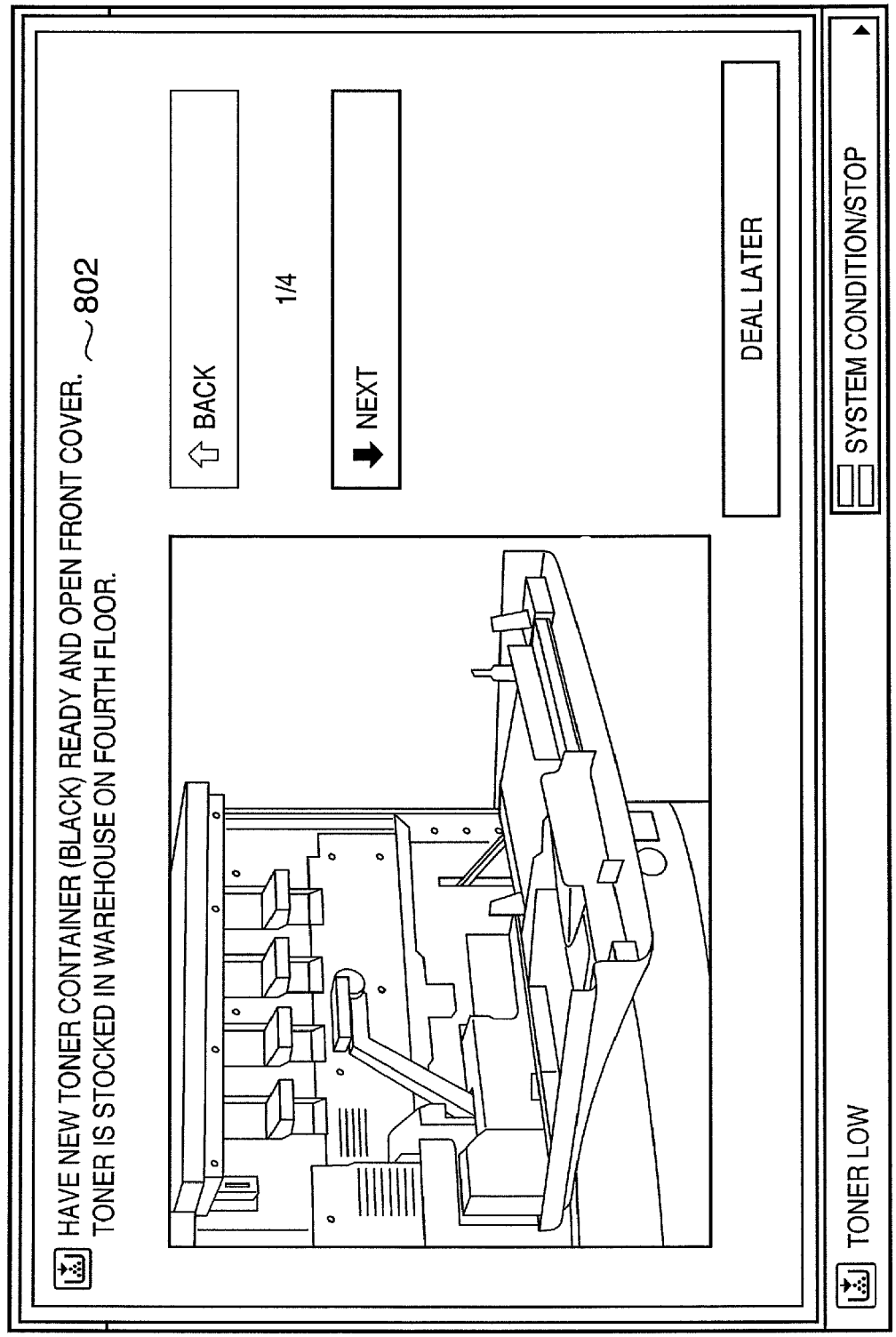
FIG. 8 is a view showing a screen example which is customized to change display of the toner storage location.

FIG. 7 shows a screen example in which a message is customized to additionally display where to make contact with the toner manager when the user is not be familiar with toner stock management. FIG. 8 shows a screen example which is customized to change display of the toner storage location depending on the installation location of the copying machine. FIG. 9 shows screen information (default screen) held by the copying machine 102 itself, which is displayed when no customization is executed by the GUI generation device 104.

The customization screen information may be held as information representing the entire screen in FIG. 7 or 8. Alternatively, information representing the difference to the default screen in FIG. 9 and the substitution location to the default screen may be held. In the latter case, the default screen shown in FIG. 9 and the customized screen shown in FIG. 7 or 8 are different only in a message portion (702, 802). The GUI generation device 104 holds only information to designate the message text to be customized and a location (902) to substitute the message in the default screen. Hence, the GUI generation device can hold a smaller amount of data than the information of the entire customized screen.

As described above, the GUI generation device 104 holds customized screens collectively. The copying machine 102 requests the screen to be displayed on the operation unit 401 from the GUI generation device. Hence, the system administrator need not customize the screen for each copying machine. As a result, the operation load on the system administrator is reduced.

An additional effect is obtained by the above configuration. For example, a copying machine conventionally switches (localizes) the displayed language in accordance with the use environment. Implementing a copying machine capable of localizing the displayed language in accordance with the use environment imposes a heavy load on the developer of the copying machine because of restriction by the development time. However, according to the copying machine of this embodiment, localization can be realized by sending a screen information request to the GUI generation device 104 without such implementation. Consequently, the load on the developer can greatly be reduced.

[Second Embodiment]

In the first embodiment, a screen information request is sent to the GUI generation device every time a screen is to be generated. However, the present invention is not particularly limited to this. For example, a GUI generation device (104) may be configured to be selectively usable considering reduction of the processing load on the GUI generation device and disconnection of the network.

Figure 10:
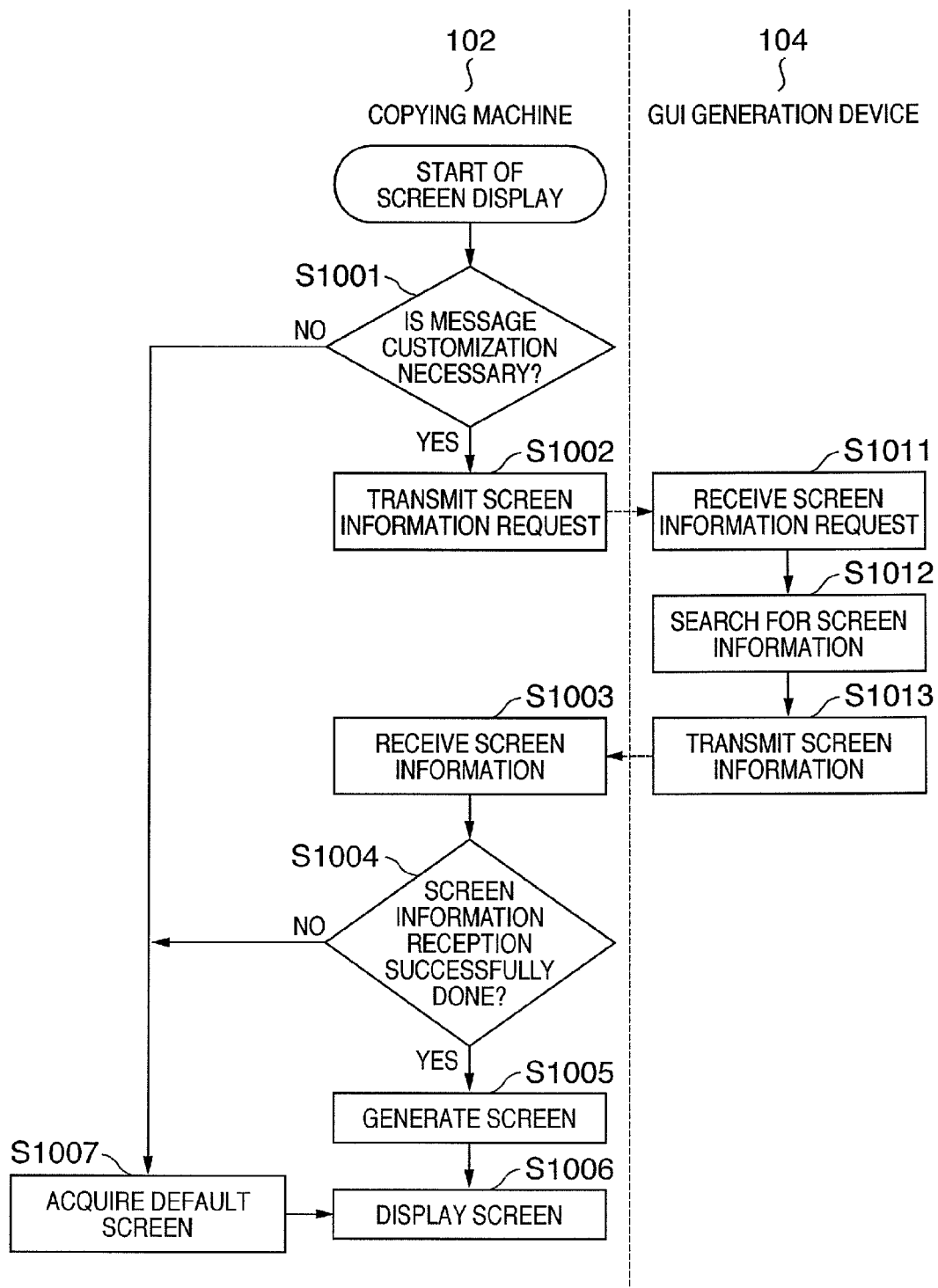
FIG. 10 is a flowchart showing the flow of customization processing when the GUI generation device is configured to be selectively usable in image generation.

FIG. 10 is a flowchart showing the flow of customization processing when the GUI generation device is configured to be selectively usable in image generation.

At the start of new screen display, in step S1001, it is determined whether screen customization is necessary. The necessity of customization may be determined on the basis of, e.g., information which is held in the copying machine in advance and represents whether customized screen information is registered in the GUI generation device 104. Determination may be done on the basis of an inquiry result obtained by inquiring of the GUI generation device every time. Alternatively, it may be determined that screen customization is necessary when a specific event has occurred in the copying machine or the copying machine is set in a specific condition (e.g., "low toner" or "paper out")

If YES in step S1001, the same processing as in the first embodiment is executed. That is, in step S1002, the copying machine transmits a screen ID, user information of the user who uses the copying machine, and location information representing the installation location of the copying machine to the GUI generation device as a screen information request.

The operation of the GUI generation device in steps S1011 to S1013 is the same as in the first embodiment, and a description thereof will be omitted.

If the copying machine cannot receive the screen information within a predetermined time in step S1003, the flow advances to step S1004. The probable reason why the copying machine cannot receive the screen information within a predetermined time is, e.g., a problem in the network between the copying machine and the UI generation device or an error in the GUI generation device. It is determined in step S1004 that reception of screen information has failed.

If it is determined in step S1004 that the screen information has been received successfully, a screen is generated on the basis of the received screen information in step S1005. On the other hand, if it is determined in step S1001 that customization is unnecessary or if it is determined in step S1004 that reception of screen information has failed, a default screen saved in the copying machine from the beginning is extracted in step S1007. In step S1006, the generated screen or extracted default screen is displayed.

As is apparent from the above description, according to this embodiment, a screen can be displayed even when customization is not necessary or reception of screen information has failed. In addition to the effect of the first embodiment, the convenience of the user who uses the copying machine can be improved.

[Third Embodiment]

The first and second embodiments contain no mention of the application to request screen information of the GUI generation device and display screen information received from the GUI generation device. A Web browser may be used as the application.

The screen information request may be sent not to a PC with the GUI generation function but to, e.g., a database server which holds screen information as a database. This embodiment will be described below.

<Functional Arrangement of Copying Machine and Functional Arrangement of Database Server>

Figure 11:
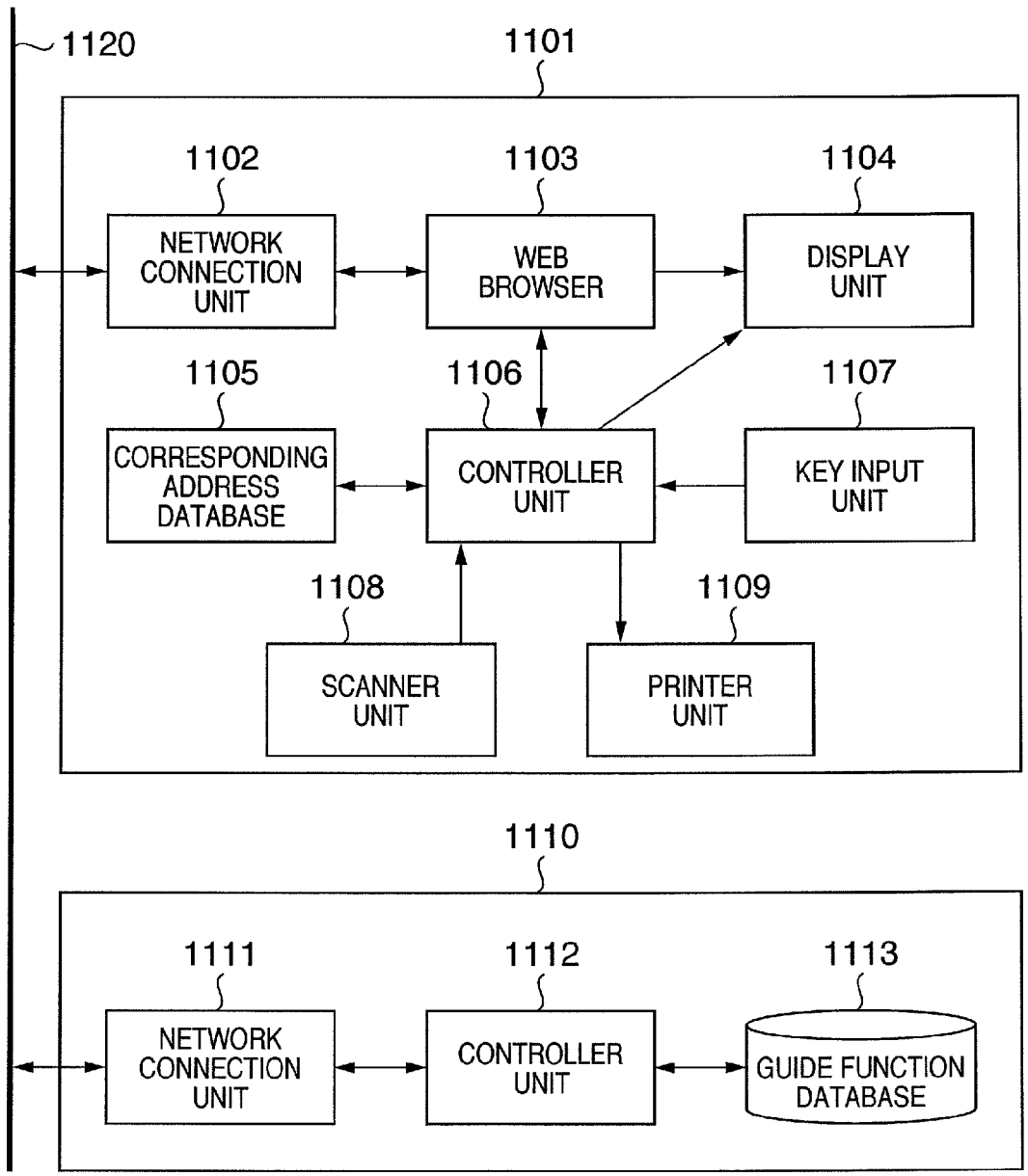
FIG. 11 is a block diagram showing the functional arrangement of a copying machine and the functional arrangement of a database server according to the second embodiment of the present invention.

FIG. 11 is a block diagram showing the functional arrangement of a copying machine and the functional arrangement of a database server according to the second embodiment of the present invention. A copying machine 1101 and database server 1110 are connected communicably through a network 1120.

As shown in FIG. 11, the copying machine 1101 comprises a network connection unit 1102, Web browser 1103, display unit 1104, corresponding address database 1105, controller unit 1106, key input unit 1107, scanner unit 1108, and printer unit 1109.

The network connection unit 1102 is connected to the network 1120 so that information is exchanged between the copying machine 1101 and the network 1120.

The Web browser 1103 displays, on the display unit 1104, web information from the network 1120.

The corresponding address database 1105 holds a correspondence table between a special situation (e.g., paper out, paper jam, or error) of the copying machine and a URL where data that explains the special situation is saved. When a special situation occurs, a URL where the data of a guide corresponding to the situation is stored can be acquired by search.

The display unit 1104 can display web information from the Web browser 1103 or the copying machine condition recognized by the controller 1106.

The controller 1106 controls the operation of the entire copying machine 1101. The controller 1106 sets the copying machine 1101 or starts an operation in response to input from the key input unit 1107. The controller 1106 also receives scan information from the scanner unit 1108 or transmits print data to the printer unit 1109.

The key input unit 1107 includes a ten-key pad and touch panel and receives data input from the user. The key input unit 1107 also comprises a change-over key to the guide screen.

The scanner unit 1108 generates image data by scanning an image. The printer unit 1109 prints image data on printing paper sheet.

The database server 1110 comprises a network connection unit 1111, controller 1112, and guide function database 1113.

The network connection unit 1111 is connected to the network 1120 to transmit/receive data through the network 1120.

The controller 1112 analyzes data received through the network connection unit 1111 and determines the operation or accesses the guide function database 1113, extracts data, and transmits the data through the network connection unit 1111.

In the guide function database 1113, details of the guide function of the copying machine 1101 are registered as a large database. The details can be browsed by referring to the data using the Web browser 1103.

<Customization Processing>

Figure 12:
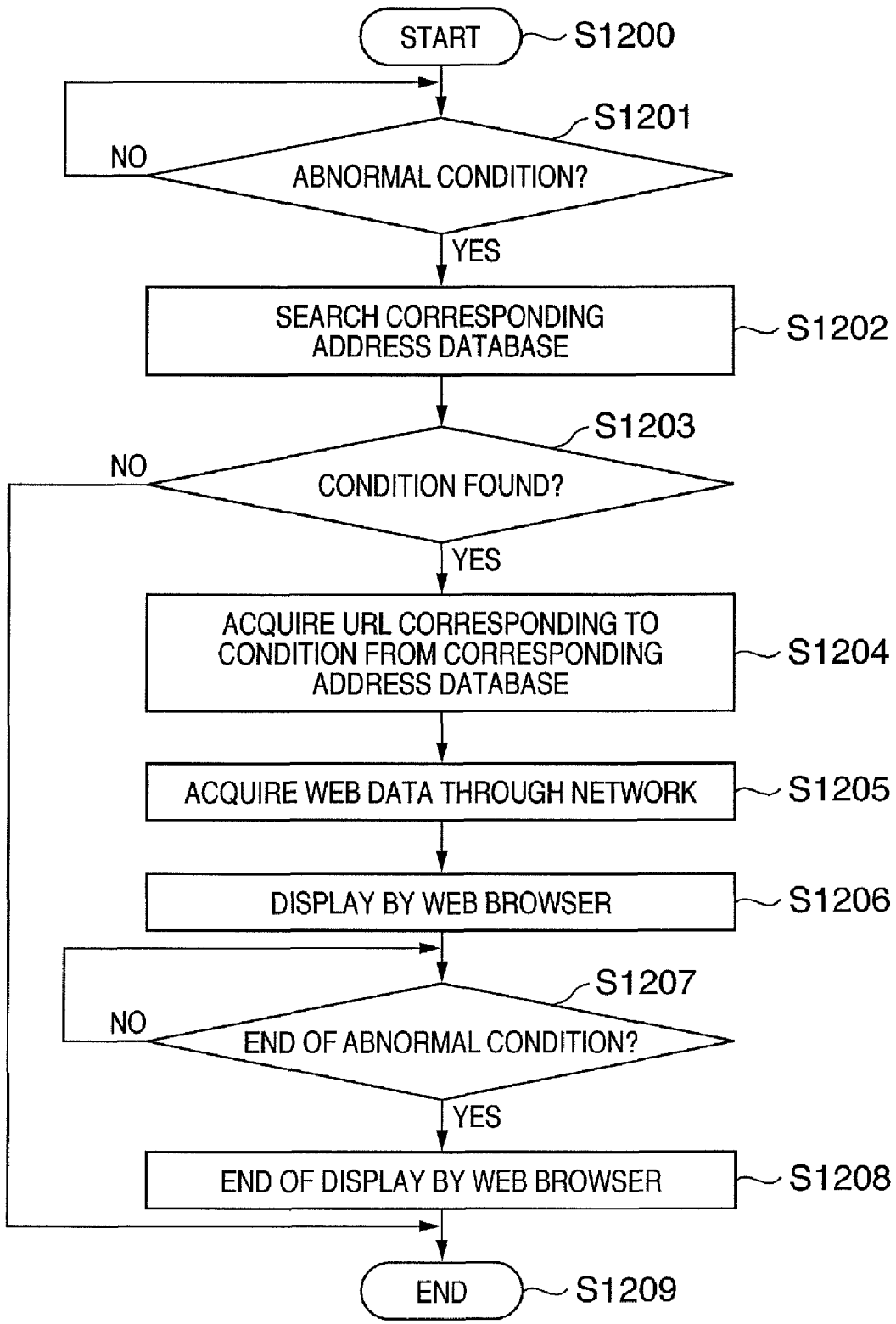
FIG. 12 is a flowchart showing the flow of display screen customization processing by a copying machine and database server according to the third embodiment of the present invention.

Display screen customization processing by the copying machine and database server according to the third embodiment of the present invention will be described next with reference to FIG. 12.

Processing starts in step S1200. In step S1201, it is determined whether the copying machine 1101 is currently in an abnormal condition. If NO in step S1201, the flow returns to step S1201 to continue to monitor the abnormal condition.

If YES in step S1201, the flow advances to step S1202.

In step S1202, search is performed to check whether information about the current condition is registered in the corresponding address database 1105. In step S1203, the search result in step S1202 is determined.

If it is determined in step S1203 that no information about the current condition is registered, the flow advances to step S1209 to end the processing.

If it is determined in step S1203 that information about the current condition is registered, the flow advances to step S1204.

In step S1204, a URL corresponding to the information about the current condition is acquired from the corresponding address database 1105. In step S1205, web information is acquired from the address of the acquired URL through the network 1120.

In step S1206, the Web browser 1103 displays the acquired web information. In step S1207, it is determined whether the abnormal condition is avoided by appropriate processing executed by the user.

If the abnormal condition is not avoided yet, the flow returns to step S1207 to continue to monitor the abnormal condition. If the abnormal condition is avoided, the flow advances to step S1208. In step s1208, the Web browser 1103 ends display of the web information so that the display returns to the normal mode of the copying machine. In step S1209, the processing is ended.

As is apparent from the above description, in this embodiment, a URL representing the storage location of data that explains an abnormal condition is set in the copying machine in advance. The data of the URL address can be displayed by using the Web browser. Hence, if an abnormal condition such as paper out, paper jam, or error occurs in the copying machine, a detailed latest corresponding guide can be displayed. The user can react optimally on the basis of the guide.

[Fourth Embodiment]

In the first to third embodiments, a copying machine is used as the present invention (image processing apparatus). However, the present invention is not particularly limited to this.

The GUI generation device of the first or second embodiment may be either a personal computer (PC) or any other information processing apparatus having a network interface.

[Other Embodiment]

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium which records software program codes to implement the functions of the above-described embodiments to the system or apparatus. In this case, the above-described functions are implemented by causing the computer (or CPU or MPU) of the system or apparatus to read out and execute the program codes stored in the storage medium. In this case, the storage medium which stores the program codes constitutes the present invention.

As the storage medium to supply the program codes, for example, a floppy® disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also, e.g., when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer. That is, the functions are also implemented when the program codes are written in the memory, and the CPU of the function expansion board or function expansion unit performs part or all of actual processing on the basis of the instructions of the program codes.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2005-015845 filed on Jan. 24, 2005, which is hereby incorporated by reference herein in its entirety.

What is claimed is:

1. An image forming apparatus, comprising:
   a management unit configured to manage relationships between each of a plurality of abnormal situations that occur in the image forming apparatus and each of a plurality of URL data;
   a recognition unit configured to recognize, when an abnormal situation has occurred in the image forming apparatus, the abnormal situation that occurred;
   a specifying unit configured to specify URL data, which corresponds to the abnormal situation recognized by the recognition unit, among the plurality of URL data managed by the management unit;
   a receiver configured to, without a user's operation, receive web page data by accessing a storage location identified by the specified URL data;
   a display device configured to display a web page screen based on the received web page data; and
   a display controller configured to control the display device to stop displaying the web page screen based on the received web page data in accordance with a recovery from the abnormal situation recognized by the recognition unit,
   wherein the web page data at the storage location is customizable by an administrator.

2. The apparatus according to claim 1, wherein information about a user and identification information to identify the image forming apparatus is transmitted in accessing the storage location.

3. The apparatus according to claim 1, wherein the display device displays the web page screen through a web browser.

4. The apparatus according to claim 1, wherein the plurality of abnormal situations include conditions in which the image forming apparatus runs out of consumable articles.

5. An information forming method in an image forming apparatus, the method comprising steps of:
   managing relationships between each of a plurality of abnormal situations that occur in the image forming apparatus and each of a plurality of URL data;
   recognizing, when an abnormal situation has occurred in the image forming apparatus, the abnormal situation that occurred;
   specifying URL data, which corresponds to the abnormal situation recognized in the recognizing step, among the plurality of URL data managed in the managing step;
   receiving, without a user's operation, web page data by accessing a storage location identified by the specified URL data;
   displaying a web page screen based on the received web page data; and
   stopping the displaying of the web page screen based on the received web page data in accordance with a recovery from the abnormal situation recognized in the recognizing step,
   wherein the web page data at the storage location is customizable by an administrator.

6. A non-transitory computer-readable storage medium storing a control program that when executed by a computer causes the computer to implement an information forming method, the method comprising steps of:

managing relationships between each of a plurality of abnormal situations that occur in an image forming apparatus and each of a plurality of URL data;

recognizing, when an abnormal situation has occurred in the image forming apparatus, the abnormal situation that occurred;

specifying URL data, which corresponds to the abnormal situation recognized in the recognizing step, among the plurality of URL data managed in the managing step;

receiving, without a user's operation, web page data by accessing a storage location identified by the specified URL data;

displaying a web page screen based on the received web page data; and stopping the displaying of the web page screen based on the received web page data in accordance with a recovery from the abnormal situation recognized in the recognizing step, wherein the web page data at the storage location is customizable by an administrator.

* * * * *